(12) United States Patent
Krick

(10) Patent No.: US 10,104,739 B2
(45) Date of Patent: Oct. 16, 2018

(54) THERMAL MANAGEMENT AND POWER SUPPLY CONTROL SYSTEM FOR AT LEAST ONE LIGHT SOURCE

(71) Applicant: Valeo Vision, Bobigny (FR)

(72) Inventor: Sébastian Krick, Paris (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 15/312,824

(22) PCT Filed: Jun. 2, 2015

(86) PCT No.: PCT/EP2015/062267
§ 371 (c)(1),
(2) Date: Nov. 21, 2016

(87) PCT Pub. No.: WO2015/185556
PCT Pub. Date: Dec. 10, 2015

(65) Prior Publication Data
US 2017/0156188 A1      Jun. 1, 2017

(30) Foreign Application Priority Data

Jun. 3, 2014 (FR) .................... 14 55036

(51) Int. Cl.
*H05B 33/08* (2006.01)
*B60Q 1/26* (2006.01)
(52) U.S. Cl.
CPC .......... *H05B 33/0854* (2013.01); *B60Q 1/26* (2013.01); *H05B 33/089* (2013.01)

(58) Field of Classification Search
CPC .. H05B 33/08; H05B 33/083; H05B 33/0833; H05B 33/0854; H05B 33/089; H05B 33/0815; H05B 33/0845; B60Q 1/26; B60Q 1/245
See application file for complete search history.

(56) References Cited

U.S. PATENT DOCUMENTS

| | | | |
|---|---|---|---|
| 7,019,506 B2 | 3/2006 | Kernahan | |
| 7,425,803 B2 | 9/2008 | Shao et al. | |
| 8,324,825 B2 | 12/2012 | Shao et al. | |
| 8,487,546 B2 | 7/2013 | Melanson | |
| 8,742,684 B2 | 6/2014 | Melanson | |
| 2004/0095120 A1* | 5/2004 | Kernahan | H02M 3/157 323/282 |
| 2006/0043911 A1 | 3/2006 | Shao et al. | |
| 2008/0297069 A1 | 12/2008 | Shao et al. | |
| 2010/0156319 A1 | 6/2010 | Melanson | |
| 2011/0068701 A1* | 3/2011 | van de Ven | H05B 33/083 315/185 R |
| 2012/0262074 A1* | 10/2012 | Wang | H05B 33/083 315/186 |
| 2013/0300309 A1 | 11/2013 | Melanson | |

FOREIGN PATENT DOCUMENTS

WO     2010025450 A2    3/2010

* cited by examiner

*Primary Examiner* — Thai Pham
(74) *Attorney, Agent, or Firm* — Oblon, McClelland, Maier & Neustadt, L.L.P.

(57) ABSTRACT

A power supply control device and a method for controlling the power supply of light sources, preferably light-emitting diodes (LEDs). The power supply device allows the thermal management of LEDs without requiring the use of a programmable DC-to-DC converter, but by systematically adjusting an automatic control value for the DC-to-DC converter used.

20 Claims, 1 Drawing Sheet

THERMAL MANAGEMENT AND POWER SUPPLY CONTROL SYSTEM FOR AT LEAST ONE LIGHT SOURCE

CROSS-REFERENCE TO RELATED APPLICATIONS

This application is the U.S. National Phase application of PCT Application No. PCT/EP2015/062267 filed Jun. 2, 2015, which claims priority to the French application 1455036 filed on Jun. 3, 2014, which applications are incorporated herein by reference and made a part hereof.

FIELD OF THE INVENTION

The invention relates to the field of the power supply for light sources. In particular, the invention relates to a thermal management and power supply control system and method for light sources, more precisely light-emitting diodes (LEDs). The invention also relates to a light device for a motor vehicle.

DESCRIPTION OF THE RELATED ART

A light-emitting diode (LED) is an electronic component which can emit light when an electric current passes therethrough. The light intensity emitted by an LED is generally dependent upon the intensity of the electric current which passes therethrough. Among other things, a LED is characterized by a current intensity threshold value. This maximum forward current generally decreases with increasing temperature. When a current of an intensity greater than the threshold value is used to power the LED, the latter can be damaged, or destroyed. In the automobile field, LED technology is increasingly used for various light signaling solutions. LEDs are used in order to provide light functions such as daytime running lights, signaling lights, etc. They are exposed to high operating temperatures.

It is known from the prior art to use a control circuit for controlling the powering of a set or group of LEDs. The circuit defines the current which passes through an arm mounted as a load and comprising the group of LEDs connected in series. In the field of the light devices for motor vehicles, it is particularly important to be able to provide a constant brightness in order to ensure the safety of the users of the vehicle and of those involved in road traffic. To provide a constant current, known control circuits use various types of DC-to-DC converters in order to convert the direct voltage provided, for example, by a car battery into a load continuous voltage, which is dependent upon the number of LEDs powered. It is known to use DC-to-DC converters managed by a programmable microcontroller element. Such converters can, furthermore, change the intensity of the current provided to the connected load, i.e. to the LEDs. Microcontrollers exist which incorporate thermal management of the LEDs. These elements can modify the intensity of the current provided to the connected load as a function of the temperature of the LEDs, in order to take into account the thermal behavior thereof.

For DC-to-DC converters with a fixed target output current value, which are less expensive and therefore widely used, the thermal management of the LEDs is problematic. The use of such converters generally does not allow the powering of LEDs to be optimally controlled. To prevent an excessive current at all temperatures to which an LED can be subjected during the operation thereof, it becomes imperative to use a target current minimum constant intensity value. Thus, the forward current maximum value of the LEDs is not exceeded by the converter when the operating temperature of the LEDs is high. However, this approach gives rise to losses in light performance at less high temperatures.

SUMMARY OF THE INVENTION

An aim of the invention is to propose a power supply control system for light sources which overcomes at least one of the disadvantages of the prior art. Another aim of the invention is to propose a power supply control method for light sources and a device for a motor vehicle using the control system according to the invention.

The object of the invention is a power supply control device for at least one light source. The device comprises:
- a DC-to-DC converter which can convert an input electrical voltage into an output electrical voltage;
- a converter load-mounted circuit comprising at least one light source; and
- a converter automatic control means, the control means having, at input, a value representing the intensity of the electric current flowing in the load-mounted circuit.

The device comprises an automatic control means comprise an adjusting circuit, suitable for adjusting the value into an automatically controlled value as a function of the measurement of the temperature obtained by means for measuring the ambient temperature.

The converter automatic control means preferably form an automatic control loop which comprises the adjusting circuit.

Advantageously, the control device does not have a microcontroller element which contributes to regulation of the current provided to the light source as a function of the temperature of this light source.

Preferably, the DC-to-DC converter can comprise a boost circuit, which can raise the voltage, and/or a buck circuit, which can lower the voltage.

The value representing the intensity of the electric current flowing in the load-mounted circuit is preferably obtained by measuring voltage at the terminals of a shunt resistor connected in series with the load-mounted circuit.

Advantageously, the light sources are light-emitting diodes (LED).

The adjusting circuit can, preferably, comprise an electrical voltage source connected to the automatic control means through a thermistor. Preferably, the resistance of the thermistor decreases when the temperature thereof increases. The thermistor is connected to a switch element, such that the switch is closed and an adjusting current of a predetermined intensity is added to the automatically controlled value only when the temperature of the thermistor is above a threshold value.

The converter automatic control means can, preferably, comprise a voltage divider bridge and a current mirror, the current being injected using the voltage source through the current mirror and the voltage divider point.

Advantageously, the switch element is a transistor, preferably a MOSFET (Metal Oxide Semiconductor Field Effect Transistor) field effect transistor.

The threshold temperature value is preferably greater than 25° C., such that the switch remains open at the ambient temperature of 25° C.

Advantageously, the threshold temperature value corresponds to the operating temperature of the LEDs. The intensity of the adjusting current is then chosen such that the DC-to-DC converter, automatically controlled by the current of adjusted intensity, is suitable for providing a load current of an intensity less than or equal to the forward current maximum intensity of the LEDs at the operating temperature thereof.

Another object of the invention is a light device for a motor vehicle comprising at least one power supply control device for light sources. The light sources particularly provide a light signaling function for the motor vehicle. The light device comprises a control device in accordance with the invention.

Another object of the invention is a power supply control method for at least one light source, comprising the steps of:
  providing a DC-to-DC converter which can convert an input electrical voltage into an output electrical voltage;
  providing a converter load-mounted circuit comprising at least one light source, the converter being automatically controlled by a value representing the intensity of the electric current flowing in the load-mounted circuit; and
  adjusting the automatically controlled value by a matching circuit as a function of a measurement of the temperature obtained by means for measuring the ambient temperature.

Thanks to the invention, it becomes possible to use a known DC-to-DC converter, which cannot in itself modify the target output current, in order to control LEDs connected as load at different levels of current. The current levels can particularly be dependent upon the operating temperature of the LEDs. This brings about a gain in performance of the LEDs with respect to the use of such a DC-to-DC converter without the invention. At low temperatures, a current of high intensity can be provided to the LEDs in order to maximize the luminescence thereof. The intensity of the current provided is reduced in line with the drop in the forward current maximum intensity which comprises LEDs at higher temperatures. This allows the lifespan of the LEDs to be increased. The invention is particularly useful in an LED powering control device without a microcontroller element, which could provide a thermal management function for the LEDs.

By using standard, durable and inexpensive components, the invention functions at the automatic control level of the DC-to-DC converter. By using the invention, a systematic bias of predefined value, which is a function of the measured ambient temperature, is introduced into the automatic control loop. The automatic control value adjusted in this manner prompts the DC-to-DC converter to provide a current of lesser intensity when the measured temperature increases. At an ambient temperature of 25° C., at which the measurements for the approval of LEDs are particularly carried out, the performance of the LEDs and the accuracy of the target output current of the DC-to-DC converter remains unchanged.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood using the description and the drawings, which are only provided in an indicative and nonlimiting manner for the invention, and wherein.

DETAILED DESCRIPTION OF THE PREFERRED EMBODIMENTS

Similar references are used to describe similar concepts through several separate embodiments. For example, the references 100, 200 describe a power supply control device for a least one light source according to the invention in two separate embodiments.

Figure 1:
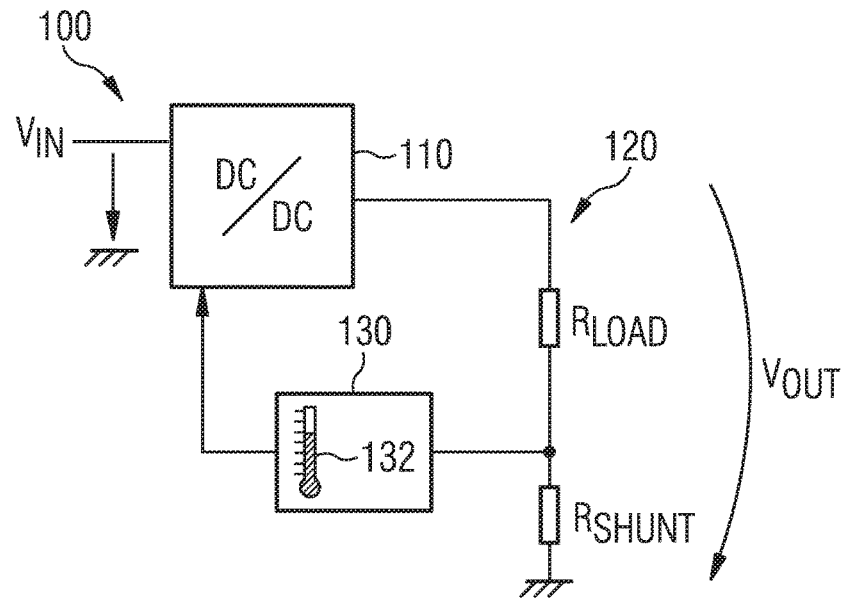
FIG. 1 is a schematic illustration of a preferred embodiment of the system according to the invention.

FIG. 1 schematically illustrates a power supply control device 100 according to the invention. The converter 110, which can be a buck or boost converter, or a combination of buck and boost converters, can convert an input direct voltage, $V_{IN}$, provided by a non-illustrated source, into an output direct voltage $V_{OUT}$. The converter 110 can provide a current with a fixed target intensity. A load circuit 120, illustrated for example by a resistor $R_{LOAD}$, is powered using the converter 110. The load circuit 120 comprises at least one, preferably several light sources advantageously connected in series. These are advantageously light-emitting diodes (LED). The power supply control device 100 does not have a microcontroller element which contributes to a regulation of the current provided to the LEDs as a function of the temperature thereof. It is known to automatically control current of the converter 110, such as to match the current intensity provided to the load circuit 120 to the fixed target current intensity of the converter 110.

According to the invention, the automatic control loop further comprises an adjusting circuit 130 for the automatically controlled value. The adjusting circuit 130 comprises means for measuring the ambient temperature, such as a thermistor 132. Using the measuring means, the adjusting circuit 130 can adjust the automatically controlled value as a function of the measurement of the temperature. As the measuring means are advantageously arranged on the same printed circuit as the LEDs, the measured temperature generally corresponds to the operating temperature of the LEDs. The actual value of the intensity of current passing through the load circuit 120 is preferably obtained by measuring voltage at the terminals of a shunt resistor $R_{SHUNT}$ connected in series with, and downstream of the load circuit 120. Advantageously, the adjusting circuit 130 comprises electric current injection means, for example an electric current source, in order to inject a positive current into the automatic control loop when the measured temperature exceeds a threshold value. This threshold value can, for example, be set through the choice of the thermistor 132 used. Preferably, it is above 25° C., and it corresponds advantageously to the operating temperature of the LEDs of the load circuit 120. The intensity of the injected current is chosen such that the bias added to the automatically controlled value prompts the converter 110 to reduce the current delivered to the load circuit 120 to a value which does not exceed the maximum current accepted by the LEDs at the threshold temperature.

According to the practical application for which the invention is useful, a person skilled in the art can adapt the threshold temperature as a function of the operating temperature of the LEDs. Likewise, the intensity of the current injected by the adjusting circuit 130 is chosen as a function of the maximum forward current of the LEDs at the operating temperature thereof and of the fixed target current of the converter 110.

The power supply control device 100 according to the invention can be used in particular for a light device for a motor vehicle. The converter 110 is then powered by a current source internal to the motor vehicle, such as the battery of the motor vehicle. The light sources powered by means of the power supply control device 100 preferably provide a light signaling function of the motor vehicle.

This generally describes the operation of the power supply control device 100 and the main steps of the method according to the invention. A concrete embodiment is described in FIG. 2, without however limiting the protection to the example given. Based on the principles described and on the example given, a person skilled in the art will be able to carry out and/or adapt the invention depending on the requirements that arise. The technical features described for a given embodiment can be used for other embodiments of the invention, unless otherwise indicated. In the embodiments described, light-emitting diodes will be considered as an example of light sources.

Figure 2:
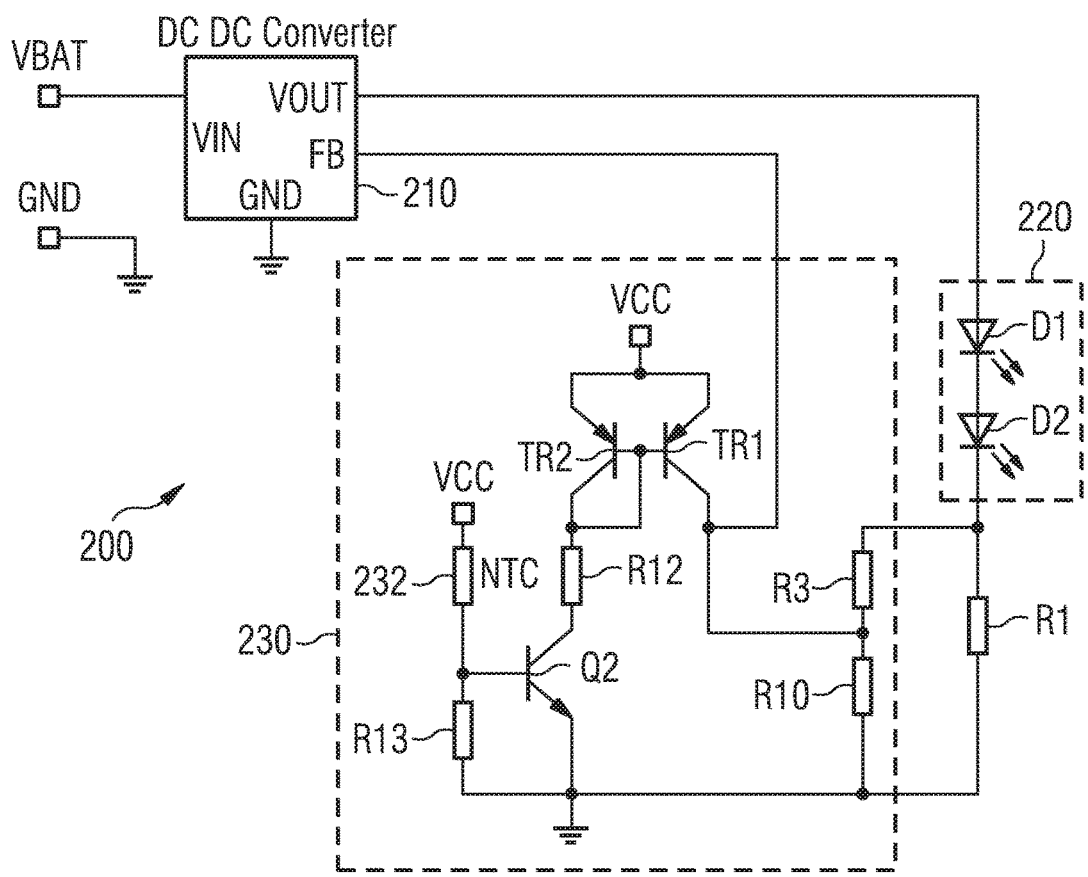
FIG. 2 is a circuit diagram illustrating a preferred embodiment of the system according to the invention.

FIG. 2 shows the diagram of an electronic circuit forming a power supply control device 200 according to the invention. The electronic components and the operation of the converter 210 will not be explained in detail within the context of the present description, since DC-to-DC converters such as the illustrated converter 210 are known per se in the art. A load circuit 220 comprises LEDs powered by the converter 210. The adjusting circuit 230 is used to adjust a value representing the intensity of the current flowing in the load circuit 220. This initial and unadjusted value is obtained by measuring the voltage at the terminals of a connection producing a shunt resistor R1.

The adjusting circuit 230 further comprises current injecting means and particularly a voltage source $V_{cc}$. The voltage source $V_{cc}$ is preferably regulated by a monitoring element of the converter 210 in order to guarantee a stable voltage level, the variations of which are small and can be monitored. The voltage source $V_{cc}$ is connected to the automatic control loop of the converter 210 through a thermistor 232, the resistance of which decreases when the temperature thereof increases. The thermistor 232 is connected to a switch element Q2 such that the switch element Q2 is closed and an adjusting current with a predetermined intensity is injected into the automatic control loop only when the temperature of the thermistor 232 is greater than a threshold value. The current is injected through the current mirror formed by the switch element Q2 or transistor elements TR1 and TR2. At ambient temperature, below the threshold temperature set by the thermistor 232, the latter and the switch element Q2 are not conductive and the current mirror is not operational. The LED current is defined by $V_{ref}$ by the ratio R3/R10 and by the shunt resistor.

At higher temperatures, the switch element Q2 starts to become conductive under the influence of the thermistor 232. The current mirror formed by the switch element Q2 or transistor elements TR1 and TR2 becomes operational and the delivered current is injected into the divider bridge formed by the resistors R3 and R10. When the switch element Q2 is completely conductive, the current intensity I12 in the current mirror is given by $V_{CC}$/R12. This current is therefore injected into the divider point and thus creates an adjustment or a bias defined by $V_{offset}=I12*(R3/R10)$. By choosing the sizes R3, R10, R12 and the thermistor 232, a person skilled in the art will therefore be able to precisely predict the high temperature adjustment value, when the thermistor 232 is conductive.

Using the description given, a person skilled in the art will be able to modify the electronic circuits described and create alternative circuits carrying out similar functions without however departing from the scope of the present invention.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A power supply control device for at least one light source, comprising:
   a DC-to-DC converter which can convert an input electrical voltage into an output electrical voltage;
   a converter load-mounted circuit comprising said at least one light source; and
   a converter automatic control loop, automatic control means having, at input, a value representing an intensity of an electric current flowing in said converter load-mounted circuit,
      wherein said converter automatic control loop comprises an adjusting circuit, wherein the adjusting circuit is suitable for adjusting said value into an automatically controlled value as a function of a measurement of the temperature obtained by a device for measuring ambient temperature, and
      wherein said power supply control device does not have a microcontroller element which contributes to a regulation of said electric current provided to said at least one light source as a function of temperature of said at least one light source.

2. The power supply control device as claimed in claim 1, wherein said DC-to-DC converter comprises a boost circuit, which can raise said input electrical voltage, and or a buck circuit, which can lower said input electrical voltage.

3. The power supply control device as claimed in claim 1, wherein said value representing said intensity of said electric current flowing in said converter load-mounted circuit is obtained by measuring voltage at the terminals of a shunt resistor connected in series with said converter load-mounted circuit.

4. The power supply control device as claimed in claim 1, wherein said at least one light, source is a light-emitting diode (LED).

5. The power supply control device as claimed in claim 1, wherein said adjusting circuit comprises an electrical voltage source connected to said automatic control loop through a thermistor, said thermistor being connected to a switch element, such that said switch element is closed and an adjusting current of a predetermined intensity is added to said automatically controlled value only when said temperature of said thermistor is above a threshold temperature value.

6. The power supply control device as claimed in claim 5, wherein said threshold temperature value is greater than 25° C., such that said switch element remains open at an ambient temperature of 25° C.

7. The power supply control device as claimed in claim 3, wherein a threshold temperature value corresponds to an operating temperature of LEDs, and Wherein an intensity of an adjusting current is chosen such that said DC-to-DC converter, automatically controlled by said intensity of said adjusting current, is suitable for providing a load current of an intensity less than or equal to a maximum forward current intensity of said LEDs at said operating temperature thereof.

8. A light device for a motor vehicle comprising at least one power supply control device for light sources, providing a light signaling function for said motor vehicle, wherein said power supply control device is in accordance with claim 1.

9. A power supply control method for at least one light source, comprising steps of:
providing a DC-to-DC converter which can convert an input electrical voltage into an output electrical voltage;
providing a converter load-mounted circuit comprising said at least one light source, said DC-to-DC converter being automatically controlled through an automatic control loop by a value representing an intensity of an electric current flowing in said converter load-mounted circuit; and
adjusting said value by a matching adjusting circuit, as a function of a measurement of temperature obtained by a device in the matching circuit for measuring ambient temperature.

10. The power supply control device as claimed in claim 2, wherein said value representing said intensity of said electric current flowing in said load-mounted circuit is obtained by measuring voltage at the terminals of a shunt resistor connected in series with said load-mounted circuit.

11. The power supply control device as claimed in claim 2, wherein said at least one light source is a light-emitting diode (LED).

12. The power supply control device as claimed in claim 3, wherein said at least one light source is a light-emitting diode (LED).

13. The power supply control device as claimed in claim 2, wherein said adjusting circuit comprises an electrical voltage source connected to said automatic control loop through a thermistor, said thermistor being connected to a switch element, such that said switch element is closed and an adjusting current of a predetermined intensity is added to said automatically controlled value only when said temperature of said thermistor is above a threshold temperature value.

14. The power supply control device as claimed in claim 3, wherein said adjusting circuit comprises an electrical voltage source connected to said automatic control loop through a thermistor, said thermistor being connected to a switch element, such that said switch element is closed and an adjusting current of a predetermined intensity is added to said automatically controlled value only when said temperature of said thermistor is above a threshold temperature value.

15. The power supply control device as claimed in claim 4, wherein said adjusting circuit comprises an electrical voltage source connected to said automatic control loop through a thermistor, said thermistor being connected to a switch element, such that said switch element is closed and an adjusting current of a predetermined intensity is added to said automatically controlled value only when said temperature of said thermistor is above a threshold temperature value.

16. The power supply control device as claimed in claim 5, wherein said threshold temperature value corresponds to an operating temperature of LEDs, and wherein said intensity of said adjusting cu current is chosen such that said DC-to-DC converter, automatically controlled by said intensity of said adjusting current, is suitable for providing a load current of an intensity less than or equal to a maximum forward current intensity of said LEDs at said operating temperature thereof.

17. The power supply control device as claimed in claim 6, wherein said threshold temperature value corresponds to an operating temperature of LEDs, and wherein said intensity of said adjusting current is chosen such that said DC-to-DC converter, automatically controlled by said intensity of said adjusting current, is suitable for providing a load current of an intensity less than or equal to a maximum forward current intensity of said LEDs at said operating temperature thereof.

18. A light device for a motor vehicle comprising at least one power supply control device for light sources, providing a light signaling function for said motor vehicle, wherein said power supply control device is in accordance with claim 2.

19. A light device for a motor vehicle comprising at least one power supply control device for light sources, providing a light signaling function for said motor vehicle, wherein said power supply control device is in accordance with claim 3.

20. A light device for a motor vehicle comprising at least one power supply control device for light sources, providing a light signaling function for said motor vehicle, wherein said power supply control device is in accordance with claim 5.

* * * * *